Patented Aug. 24, 1937

2,090,626

UNITED STATES PATENT OFFICE 2,090,626

METHOD OF PREVENTING INFILTRATION IN WELLS

John J. Grebe, Midland, Mich., assignor to The Dow Chemical Company, Midland, Mich., a corporation of Michigan No Drawing. Application September 5, 1936, Serial No. 99,622

3 Claims. (Cl. 166—21)

The invention relates to methods of shutting off water infiltration in oil and gas wells wherein a solution is injected into the formation producing a precipitate with water therein. It more particularly concerns an improved method of effecting the formation of a plugging precipitate in a water-bearing portion of the formation effectively reducing its permeability to the passage of water without materially reducing the permeability to oil of the oil-bearing formation of a well.

Methods heretofore proposed for shutting off water in oil or gas wells which depend upon the production of a precipitate in the water-bearing stratum by injecting therein a solution containing an agent forming a precipitate with the water are far from being satisfactory. Besides not forming precipitates which will resist the strong water pressure usually encountered in deep wells, agents heretofore proposed cannot be readily injected into the formation except for a relatively short distance owing to premature precipitation.

It has been proposed to inject soluble alkali silicate solution such as water glass into water-bearing strata of deep wells and the like to effect a reduction of water infiltration, since the waters therein are invariably hard and produce water-insoluble precipitates with alkali silicate solutions. I have found that silicate solutions, although relatively inexpensive and easy to handle safely, are not adequately effective for shutting off water, particularly in deep wells where the water pressure is often very great. Tests made indicate that it is difficult to obtain adequate penetration into the formation of the solution which reacts practically instantaneously with the calcium or magnesium salts present in the ground water producing a precipitate hindering the penetration of the solution. As a result the solution penetrates but a relatively short distance before precipitation prevents further penetration without applying excessive injection pressures. The precipitate so produced I have found does not resist back pressures even though these be relatively small compared to the injection pressure. On releasing the injection pressure, therefore, the ground waters return more or less readily and in time may wash the precipitate from the formation.

I have now found that by mixing with the silicate solution a water-soluble soap capable of forming a water-insoluble precipitate with calcium and magnesium salts the disadvantages accruing to the use of silicate alone are substantially overcome. Injection of a soluble silicate-soap solution into the formation not only can be accomplished readily without great hindrance from premature precipitation, but also without material risk of hindering the flow of oil to the well. The presence of dissolved soap in the silicate solution has several important functions:—
(1) in the presence of silicate the soap delays precipitation so that complete pore stoppage does not occur immediately during injection, the soap has a lubricating effect permitting lower injection pressures to suffice in forcing the solution into the water wet pores of the formation, as a consequence a greater degree of penetration of the solution can be had than with silicate alone or soap alone; (2) the adhesive and cohesive quality of the soap precipitate improves the plugging action of the silicate although the soap alone is somewhat readily removed by back pressure; (3) the soap-silicate solution is substantially inert to oil, hence deposition of the precipitate does not occur on contact with oil; and (4) soap renders the deposit removable by acids so that formations which have been plugged by the deposit can be reopened by conventional methods of acid treating wells using hydrochloric acid. The invention, then, consists of the method hereinafter fully described and particularly pointed out in the claims.

In carrying out the invention a solution of soluble silicate and soap is prepared, if not available, by mixing a commercial liquid silicate solution with a soap soluble in water. A considerable variation in the concentration of either the soap or silicate solution employed is allowable. Commercial sodium silicate solutions containing from 60 per cent to 95 per cent of water and having a ratio of $Na_2O : SiO_2$ of between about $1 : 1.6$ and $1 : 4$ are generally suitable. A 40° Baumé sodium silicate solution having a ratio of $Na_2O : SiO_2$ of about $1 : 3.2$ is a preferred concentration. Such solution is mixed with an alkali metal soap to form a mobile solution with the silicate. The effectiveness of the soap-silicate mixture varies to some extent with the proportion of soap to silicate. Mixtures in which the proportion of soap is in excess of that of the silicate are very effective, a suitable proportion, for example, is between 30 and 50 parts by volume of a potassium soap solution containing 60 per cent of water, and from 6 to 12 parts by volume of 40° Baumé commercial sodium silicate having a ratio of $Na_2O : SiO_2$ of $1 : 3.2$. A generally satisfactory solution is one comprising 13 per cent by weight of the potassium soap of coconut oil and 4 per cent by weight of sodium silicate having a ratio of $Na_2O : SiO_2$ of $1 : 3.2$, the balance being water.

In shutting off a brine or water-bearing stratum of a well, the water of which carries the usual hardness imparting salts, there is introduced into the well and thence into the formation the soap-silicate solution. The solution is allowed to remain in the earth formation by holding the injection pressure on the solution which gradually mixes with the ground water forming a water-insoluble precipitate or deposit in the pore spaces in the formation. Before injecting the solution it is generally desirable to remove any brine from the bore of the well and to flush the well with water free from precipitable salts. Some water or oil may be advantageously injected into the formation ahead of the solution.

The manner of injecting the solution into the water-bearing stratum depends upon the particular conditions encountered. Flowing wells provided with the usual casing and tubing may be treated by introducing the solution down the tubing until it reaches the formation to be treated and then forcing in oil behind the solution while the casing head is closed. Pumping wells may be treated either through the casing or the tubing. For example, the solution may be injected through the casing until it reaches the bottom of the well, the liquids in the well being pumped out through the tubing so that the treating solution displaces the well liquids as these are removed by the pump. A load of oil is then introduced into the well, pressure being applied to it if necessary, thereby forcing the treating solution into the formation.

The solution is allowed to remain in the formation until the reaction with the water therein has effectively produced precipitation, pressure being maintained upon the solution during this time. The treating solution is substantially inert to oil so that it does not react therewith to form clogging deposits.

The injection into a formation wet by brine or hard water of a solution of the type described has the advantage of not rapidly developing clogging deposits which would hinder penetration of the solution. Instead the solution is self-lubricating facilitating its penetration. The solution forms water-insoluble deposits in the formation not readily displaceable by water or brine as are those produced by either soap solutions or silicate solutions alone, yet the deposit is removable by a conventional acid treatment. The plugging action of the solution is selective since it is substantially inert to oil and may be flushed out of oil-bearing passages by the oil when the injection pressure is released.

Other modes of applying the principle of my invention may be employed instead of those explained, change being made as regards the method herein disclosed, provided the step stated by any of the following claims or the equivalent of such stated step be employed.

I therefore particularly point out and distinctly claim as my invention:—

1. In a method of treating water-bearing earth or rock formations adjacent the bore of an oil or gas well, the step which consists in introducing into the well and thence into the formation an aqueous treating solution substantially inert to oil comprising a soluble silicate and a water-soluble soap.

2. In a method of treating water-bearing earth or rock formations adjacent the bore of an oil or gas well, the step which consists in introducing into the well and thence into the formation an aqueous treating solution substantially inert to oil comprising a soluble silicate and a water-soluble soap, the proportion of soap in the solution being in excess of that of the silicate.

3. In a method of treating water-bearing earth or rock formations adjacent the bore of an oil or gas well, the step which consists in introducing into the well and thence into the formation an aqueous treating solution substantially inert to oil comprising a soluble silicate and a potassium soap, the proportion of soap in the solution being in excess of that of the silicate.

JOHN J. GREBE.